(12) United States Patent
Kwon et al.

(10) Patent No.: US 10,796,068 B2
(45) Date of Patent: Oct. 6, 2020

(54) STANDARD CELL DESIGN SYSTEM, STANDARD CELL DESIGN OPTIMIZATION METHOD THEREOF, AND SEMICONDUCTOR DESIGN SYSTEM

(71) Applicant: SAMSUNG ELECTRONICS CO., LTD., Suwon-si (KR)

(72) Inventors: Uihui Kwon, Hwaseong-si (KR); Weiyi Qi, San Jose, CA (US); Yang Lu, San Jose, CA (US); Saetbyeol Ahn, Seoul (KR); Takeshi Okagaki, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/390,087

(22) Filed: Apr. 22, 2019

(65) Prior Publication Data
US 2020/0082051 A1 Mar. 12, 2020

Related U.S. Application Data

(60) Provisional application No. 62/729,615, filed on Sep. 11, 2018.

(30) Foreign Application Priority Data

Oct. 26, 2018 (KR) ........................ 10-2018-0128920

(51) Int. Cl.
*G06F 30/398* (2020.01)
*G06N 20/00* (2019.01)
(Continued)

(52) U.S. Cl.
CPC .......... *G06F 30/398* (2020.01); *G06F 30/392* (2020.01); *G06N 20/00* (2019.01); *G06F 2119/18* (2020.01)

(58) Field of Classification Search
CPC .. G06F 30/398; G06F 30/392; G06F 2119/18; G06N 20/00; G06N 3/08; G06N 3/0454; G06N 20/10; G06N 20/20
See application file for complete search history.

(56) References Cited

U.S. PATENT DOCUMENTS

| 6,557,145 B2 | 4/2003 | Boyle et al. |
| 7,225,423 B2 | 5/2007 | Bhattacharya et al. |

(Continued)

OTHER PUBLICATIONS

Liebmann, et al., "Design Technology Co-Optimization in the Era of Sub-Resolution IC Scaling", 2016, SPIE Press Book, 2 pages total, https://doi.org/10.1117/3.2217861.

(Continued)

*Primary Examiner* — Stacy Whitmore
(74) *Attorney, Agent, or Firm* — Sughrue Mion, PLLC

(57) ABSTRACT

A standard cell design system is provided. The standard cell design system includes at least one processor configured to implement: a control engine that determines planar parameters and vertical parameters of a target standard cell, a three-dimensional structure generating engine that generates a three-dimensional structure of the target standard cell based on the planar parameters and the vertical parameters, an extraction engine that extracts a standard cell model of the target standard cell from the three-dimensional structure, an assessment engine that performs a plurality of assessment operations based on the standard cell model, and an auto-optimizing engine that adjusts, based on a machine learning algorithm, the planar parameters and the vertical parameters based on results of the plurality of assessment operations.

17 Claims, 13 Drawing Sheets

(51) Int. Cl.
*G06F 30/392* (2020.01)
*G06F 119/18* (2020.01)

(56) References Cited

U.S. PATENT DOCUMENTS

| | | | |
|---|---|---|---|
| 8,024,674 B2 | 9/2011 | Arimoto | |
| 8,112,729 B2 | 2/2012 | Tonti et al. | |
| 8,266,569 B2 | 9/2012 | Palisetti et al. | |
| 8,336,003 B2 * | 12/2012 | Cheng | G03F 1/38 |
| | | | 716/50 |
| 8,578,316 B1 | 11/2013 | Joshi et al. | |
| 8,789,002 B2 | 7/2014 | Tanaka | |
| 9,021,414 B1 * | 4/2015 | Or-Bach | G06F 30/392 |
| | | | 716/122 |
| 9,081,919 B2 | 7/2015 | Dai et al. | |
| 9,098,666 B2 * | 8/2015 | Samadi | G06F 30/392 |
| 9,147,032 B2 * | 9/2015 | Ward | G06F 30/3323 |
| 9,317,626 B2 * | 4/2016 | Chan | G06N 3/126 |
| 9,792,397 B1 * | 10/2017 | Nagaraja | G06F 30/3323 |
| 9,892,223 B1 * | 2/2018 | Nagaraja | G06F 30/327 |
| 9,953,125 B2 | 4/2018 | Caimi et al. | |
| 10,127,344 B2 * | 11/2018 | Or-Bach | G06F 30/394 |
| 10,303,823 B2 * | 5/2019 | Huang | H01L 25/0657 |
| 2003/0220770 A1 * | 11/2003 | Eikyu | G06F 30/367 |
| | | | 703/1 |
| 2014/0149958 A1 * | 5/2014 | Samadi | G06F 30/392 |
| | | | 716/123 |
| 2015/0205903 A1 * | 7/2015 | Or-Bach | G06F 30/394 |
| | | | 716/124 |
| 2017/0039308 A1 | 2/2017 | Moroz et al. | |
| 2017/0278789 A1 | 9/2017 | Chuang et al. | |
| 2017/0357911 A1 * | 12/2017 | Liu | G06F 30/39 |
| 2018/0121594 A1 * | 5/2018 | Studders | G06F 30/398 |
| 2018/0137150 A1 * | 5/2018 | Osesina | G06N 5/048 |
| 2018/0247006 A1 * | 8/2018 | Dai | G06F 30/327 |
| 2018/0285493 A1 * | 10/2018 | Huang | G06F 30/23 |
| 2018/0314163 A1 * | 11/2018 | Liu | G06N 20/00 |
| 2019/0026625 A1 * | 1/2019 | Vorenkamp | G06N 3/08 |
| 2019/0080036 A1 * | 3/2019 | Dai | G06F 30/33 |
| 2019/0087526 A1 * | 3/2019 | Park | G06N 20/10 |
| 2019/0147134 A1 * | 5/2019 | Wang | G03F 1/36 |
| | | | 716/52 |
| 2019/0303526 A1 * | 10/2019 | Wang | G06F 30/394 |
| 2019/0354023 A1 * | 11/2019 | Liu | G03F 7/70491 |
| 2020/0003678 A1 * | 1/2020 | Wolf | G01N 21/25 |
| 2020/0074611 A1 * | 3/2020 | Dou | G06T 7/74 |

OTHER PUBLICATIONS

Anonymous, "Intel presents Technology and Manufacturing Day", 2017, Intel Newsroom, 2 pages total, https://newsroom.intel.com/news/intel-presents-technology-manufacturing-day-live-video-updates/.

Wang, et al., "FinFET Centric Variability-Aware Compact Model Extraction and Generation Technology Supporting DTCO", 2015, IEEE Transactions on Electron Devices, vol. 62, Issue No. 10, pp. 3139-3146.

Ma, et al., "(Invited) Future Perspectives of TCAD in the Industry", 2016, Simulation of Semiconductor Processes and Devices, pp. 335-339.

Junker, et al., "A million wafer, virtual fabrication approach to determine process capability requirements for an industry-standard 5nm BEOL two-level metal flow", 2016, Simulation of Semiconductor Processes and Devices, pp. 43-46.

Mojumder, et al., "Novel Critical Path Aware Transistor Optimization for Mobile SoC Device-Circuit Co-design", 2014, Symposium on VLSI Technology Digest of Technical Papers, 2 pages total.

Lee, et al., "Layout-induced stress effects on the performance and variation of FinFETs", 2015, SISPAD, pp. 369-372.

Seresht, "Numerical Modeling of Self-heating in MOSFET and FinFET Basic Logic Gates Using Effective Thermal Conductivity", 2012, Mechanical & Industrial Engineering Department University of Toronto, 108 pages total.

Wong, et al., "Monolithic 3D Integrated Circuits (Invited)", 2007, IEEE, VLSI Symposium, 4 pages total.

Arabi, "3D VLSI: Next Generation 3D Integration Technology", 2014, Qualcomm Technologies, Inc., ISPD Symposium, 108 pages total.

Kwon, et al., "Intelligent DTCO (iDTCO) for next generation logic path-finding", 2018, IEEE, pp. 49-52.

* cited by examiner

STANDARD CELL DESIGN SYSTEM, STANDARD CELL DESIGN OPTIMIZATION METHOD THEREOF, AND SEMICONDUCTOR DESIGN SYSTEM

CROSS-REFERENCE TO RELATED APPLICATIONS

This U.S. non-provisional application claims the benefit of U.S. Provisional Patent Provisional No. 62/729,615 filed Sep. 11, 2018, in the U.S. Patent and Trademark Office, and priority under 35 U.S.C. § 119 to Korean Patent Application No. 10-2018-0128920 filed Oct. 26, 2018, in the Korean Intellectual Property Office, the contents of which are hereby incorporated by reference in their entireties.

FIELD

Methods and apparatuses consistent with example embodiments relate to a semiconductor device, and more particularly, relate to a standard cell design system, a standard cell design optimization method thereof, and a semiconductor design system.

BACKGROUND

A semiconductor integrated circuit is manufactured based on the layout. A process of generating the layout of the semiconductor integrated circuit may include various processes. For example, the process of generating the layout of the semiconductor integrated circuit may include a placement process of placing semiconductor elements, such as transistors, in the layout, and a routing process of connecting (or routing) the semiconductor elements in the layout.

For example, a semiconductor element, such as a transistor, may be provided in the form of a standard cell. The standard cell may be a logic element or a semiconductor device having a shape which is defined in advance based on a particular manufacturing process. The standard cell may be determined in advance through various schemes. However, as sub-micron technologies used to manufacture semiconductor integrated circuits and other semiconductor manufacturing technologies develop, research has focused on standard cells or next-generation standard cells optimized for the sub-micron technologies.

SUMMARY

According to an example embodiment, a standard cell design system includes at least one processor configured to implement: a control engine configured to determine planar parameters and vertical parameters of a target standard cell, a three-dimensional structure generating engine configured to generate a three-dimensional structure of the target standard cell based on the planar parameters and the vertical parameters, an extraction engine configured to extract a standard cell model of the target standard cell from the three-dimensional structure, an assessment engine configured to perform a plurality of assessment operations based on the standard cell model, and an auto-optimizing engine configured to adjust, based on a machine learning algorithm, the planar parameters and the vertical parameters based on results of the plurality of assessment operations.

According to an example embodiment, a standard cell design optimization method of a standard cell design system includes determining planar parameters and vertical parameters of a target standard cell; generating a first three-dimensional structure of the target standard cell based on the planar parameters and the vertical parameters; extracting a first standard cell model from the first three-dimensional structure; performing a plurality of assessment operations on the target standard cell based on the first standard cell model; determining whether results of the plurality of assessment operations satisfy a plurality of reference values, respectively; identifying, based on the results of the plurality of assessment operations not satisfying the plurality of reference values, readjusted planar parameters and readjusted vertical parameters based on a training model updated according to the planar parameters, the vertical parameters, and the results of the plurality of assessment operations; generating a second three-dimensional structure based on the readjusted planar parameters and the readjusted vertical parameters; extracting a second standard cell model based on the second three-dimensional structure; and performing the plurality of assessment operations based on the second standard cell model.

According to an example embodiment, a semiconductor design system includes at least one processor configured to implement: a standard cell design system configured to optimize planar parameters and vertical parameters of a plurality of standard cells based on a first machine learning algorithm, a standard cell library configured to generate optimized standard cell information respectively corresponding to each of the plurality of standard cells based on the planar parameters and the vertical parameters optimized by the standard cell design system, and a block design system configured to generate a block layout of a target semiconductor device based on the optimized standard cell information generated by the standard cell library.

According to an example embodiment, an optimization system includes a processor, and a memory including instructions executable by the processor. The instructions, when executed by the processor, cause the processor to determine planar parameters and vertical parameters of a target standard cell, to generate a three-dimensional structure of the target standard cell based on the planar parameters and the vertical parameters, to extract a standard cell model from the three-dimensional structure, to perform a plurality of assessment operations on the target standard cell based on the standard cell model, and to adjust, based on a first machine learning algorithm, the planar parameters and the vertical parameters based on results of the plurality of assessment operations.

BRIEF DESCRIPTION OF THE DRAWINGS

The above and other aspects, features and advantages will be more clearly understood from the following detailed description taken in conjunction with the accompanying drawings.

DETAILED DESCRIPTION

Below, terms which are used in the detailed description or accompanying drawings, such as "unit", "engine", "tool", and "system" may be implemented with a hardware component or a software component configured to perform a proposed function, or a combination of the hardware component and the software component. For example, the software component may include a machine code, firmware, an embedded code, and application software, and the hardware component may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
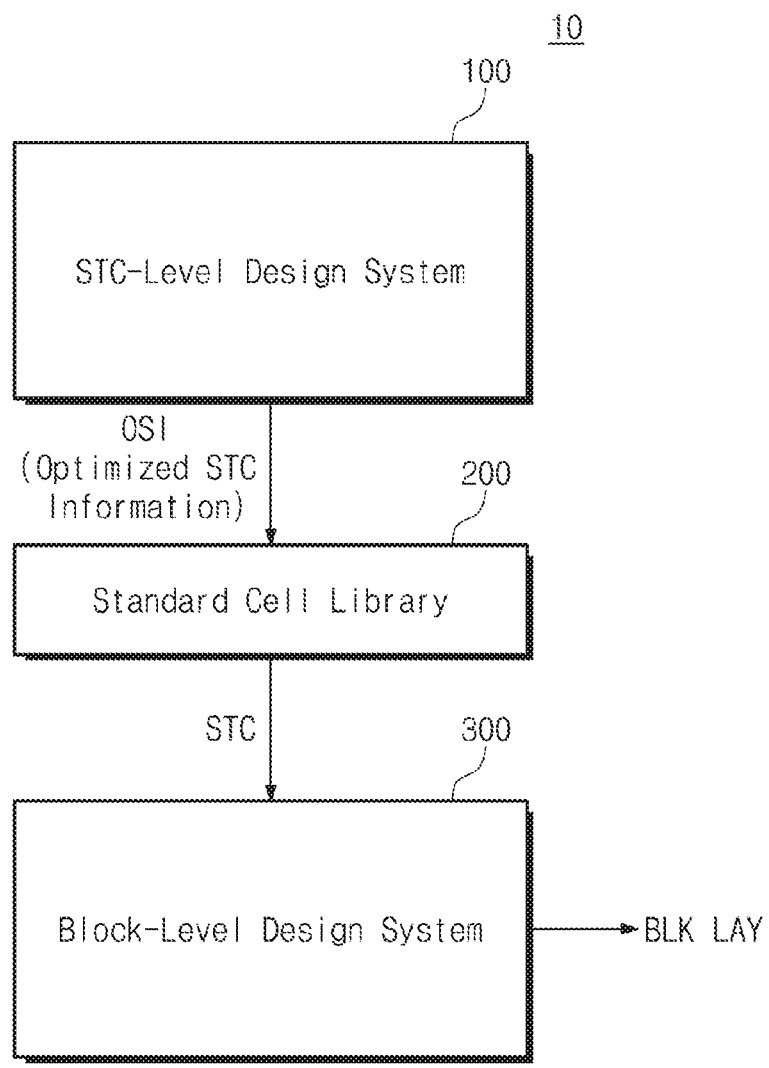
FIG. 1 is a block diagram illustrating a semiconductor design system according to an example embodiment.

FIG. 1 is a block diagram illustrating a semiconductor design system according to an example embodiment. Referring to FIG. 1, a semiconductor design system 10 may include a design system of a standard cell level (e.g., SCT-level design system 100), a standard cell library 200, and a design system of a block level (e.g., block-level design system 300). In an example embodiment, the design system 100 of the standard cell level and the design system 300 of the block level may be a design technology co-optimization (DTCO)-based system. The DTCO may indicate a system or tool which optimizes a standard cell used in a semiconductor design process or optimizes a layout of a block unit using a standard cell. Below, the term "design system" may indicate a DTCO-based system or tool.

The design system 100 of the standard cell level (hereinafter referred to as a "standard cell design system") may generate optimized standard cell information OSI based on various information such as a semiconductor process condition and standard cell layout information. The optimized standard cell information OSI may include information about a semiconductor process condition and a layout of a standard cell which are optimized in various conditions (e.g., performance, power, area, and yield (PPAY)).

Below, the term "optimization" may refer to adjust various parameters (e.g., a layout of a standard cell, a process condition, and a standard cell composition material) such that various conditions, such as PPAY, of a target standard cell satisfy present reference values. For example, the optimization operation may indicate an operation of adjusting various parameters to improve performance, to reduce power consumption, to reduce the area, and to increase the yield.

In an example embodiment, the standard cell design system 100 may simulate a three-dimensional (3D) structure to which a litho contour, based on an optical proximity correction (OPC) model of a process condition, is applied. The standard cell design system 100 may extract a standard cell model from the simulated 3D structure. The standard cell design system 100 may perform PPAY assessment on the extracted standard cell model. The standard cell design system 100 may optimize various process conditions and a layout associated with a standard cell, based on a result of the assessment.

In an example embodiment, the standard cell design system 100 may repeatedly perform the above-described operation to generate the optimized standard cell information OSI. In an example embodiment, the standard cell design system 100 may perform the above-described optimization operation, based on a machine learning algorithm. In an example embodiment, the standard cell design system 100 may repeatedly perform the above-described operation to generate or update a training model for performing the optimization operation. A configuration of the standard cell design system 100 and an optimization operation based on the machine learning algorithm will be more fully described with reference to the following drawings.

The standard cell library 200 may be generated based on the optimized standard cell information OSI. The standard cell library 200 may include information about various standard cells which are used in a particular process condition.

The block-level design system 300 may generate a block layout BLK LAY associated with a semiconductor device, based on the standard cell library 200. For example, the block-level design system 300 may be configured to generate the block layout BLK LAY by using standard cell information stored in the standard cell library 200 to place (or arrange) various standard cells and wires for connecting the standard cells.

In this case, the block-level design system 300 may optimize the block layout BLK LAY. For example, the block-level design system 300 may generate the block layout BLK LAY in consideration of a local layout effect (LLE) or a self-heating effect (SHE) such that the PPAY of a semiconductor device is optimized. In an example embodiment, the generated block layout BLK LAY may be used to manufacture various kinds of semiconductor devices (e.g., integrated circuits such as an application processor (AP), an application specific integrated circuit (ASIC), and a field programmable gate array (FPGA)) or memory devices such as a flash memory and a dynamic random access memory (DRAM).

Figure 2:
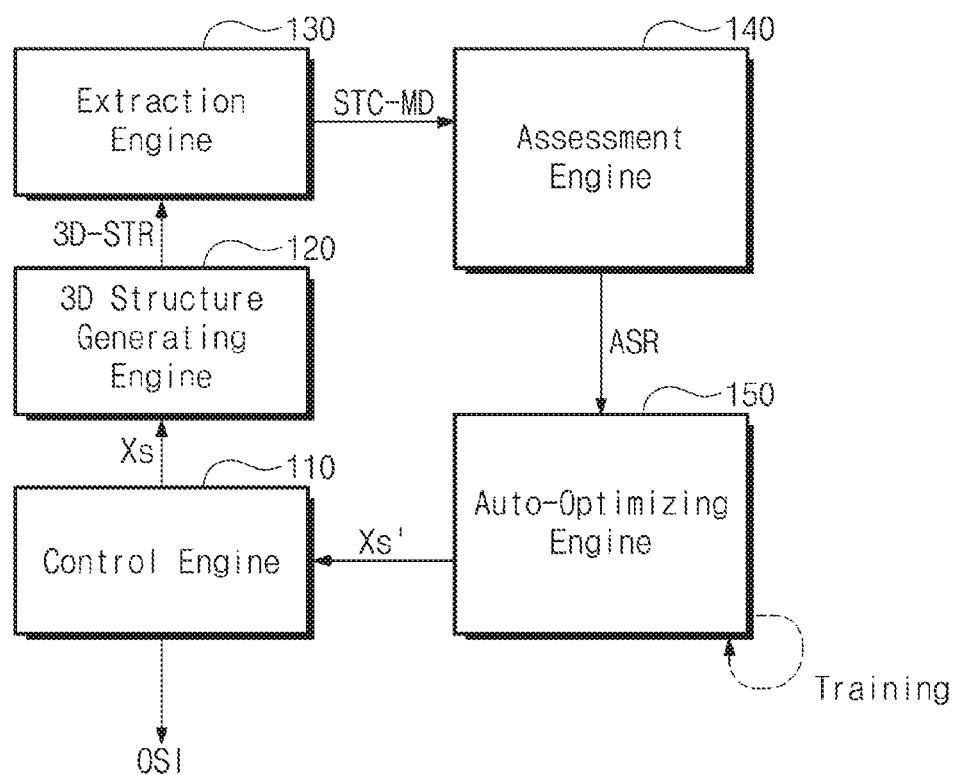
FIG. 2 is a block diagram illustrating a standard cell design system of FIG. 1.

FIG. 2 is a block diagram illustrating a standard cell design system of FIG. 1. Referring to FIGS. 1 and 2, the standard cell design system 100 may include a control engine 110, a 3D structure generating engine 120, an extraction engine 130, an assessment engine 140, and an auto-optimizing engine 150.

The control engine 110 may determine a standard cell targeted for optimization among various standard cells as a target standard cell, and may adjust a plurality of parameters Xs for the determined target standard cell. The plurality of parameters Xs may include a planar parameter and a vertical parameter associated with the target standard cell.

For example, a standard cell indicates a semiconductor device (or a logic device), the process condition and layout of which are determined in advance to improve a design speed of a semiconductor integrated circuit. The standard cell may be used to manufacture or implement various semiconductor devices (or logic devices) such as a 2-input NAND gate, a 2-input NOR gate, a flip-flop, a static RAM (SRAM), an AND-INVERTER-OR (AIO) gate, and the like. The standard cell may include one or more transistors or semiconductor elements. The target standard cell may correspond to a standard cell for a logic element to be optimized by the standard cell design system 100. For example, in the case where optimization is performed on an inverter, a target standard cell which is optimized by the standard cell design system 100 may be a standard cell corresponding to the inverter.

In an example embodiment, planar parameters may indicate a planar layout for the target standard cell or various information about the planar layout for the target standard cell. For example, in the case where the target standard cell is an inverter, the target standard cell may include one positive channel metal oxide semiconductor (PMOS) transistor and one negative channel metal oxide semiconductor (NMOS) transistor. In this case, the planar layout for the target standard cell may indicate information about planar placement of a PMOS transistor and an NMOS transistor and placement of wires for connecting the PMOS transistor and the NMOS transistor, on a semiconductor wafer. Alternatively, the planar layout may indicate individual sizes of various elements (e.g., a gate electrode, a gate contact, an active area, and the like) included in each transistor, placement intervals between the elements, etc.

That is, the planar parameter may include planar information about sizes of semiconductor elements or various elements (e.g., a gate electrode, a gate contact, a source contact, a drain contact, an active area, and the like) of the target standard cell, a distance between the elements, locations of the elements, etc.

In an example embodiment, the vertical parameter may indicate various process information about the target standard cell. For example, the target standard cell may be generated based on the various process information. The various process information may include information which is required to manufacture a target standard cell, such as a process scale (e.g., 14 nm, 10 nm, 7 nm, and the like) of the target standard cell, a transistor structure (e.g., a planar transistor structure, a FinFET structure, a next-generation semiconductor structure, and the like) of the target standard cell, a composition material of a transistor of the target standard cell, and the like. A shape, a structure, or a composition material of a transistor included in a target standard cell may be changed according to the above-described process information, and thus, results (e.g., PPAY) of assessing the target standard cell may be changed.

In an example embodiment, various information about the planar parameter or the vertical parameter may be provided from a separate database. The separate database may be configured to store and manage various process conditions or various information about a type of a standard cell.

The 3D structure generating engine 120 may generate (or simulate) a 3D structure for a target standard cell based on the plurality of parameters Xs (including the planar parameter and the vertical parameter) determined from the control engine 110. For example, the 3D structure generating engine 120 may automatically generate a 3D structure through parameterization of the plurality of parameters Xs. In an example embodiment, the 3D structure generating engine 120 may include any one of various emulators (e.g., Synopsys Process Explorer™, Coventor SEMulator3D™) and may generate a 3D structure 3D-STR for a target standard cell by using the various emulators. In an example embodiment, the 3D structure may be full-3D FEOL/MOL/BEOL structure to which MTS and process assumption (PA) are applied.

In an example embodiment, the 3D structure generating engine 120 may apply the litho contour based on an optical proximity correction (OPC) model to the 3D structure 3D-STR. For example, the 3D structure 3D-STR may be generated in an ideal shape (i.e., a shape that an edge area is rectangular). However, a shape of an actually manufactured standard cell may be different from the ideal shape due to various physical phenomena in the actual semiconductor manufacturing process. In the semiconductor manufacturing process, the OPC model may be applied to correct the structural difference. The 3D structure generating engine 120 according to example embodiments may generate the 3D structure 3D-STR similar to the actually manufactured standard cell in shape, by using the litho contour which is based on the above-described OPC model. The 3D structure 3D-STR to which the litho contour is applied will be more fully described with reference to FIGS. 4A and 4B.

The extraction engine 130 may extract a standard cell model STC-MD from the generated 3D structure 3D-STR. For example, the standard cell model STC-MD may include a compact model and a parasitic RC extraction (PEX) model. The extraction engine 130 may include an extraction tool such as Synopsys Mystic™. The extraction engine 130 may extract a compact model for a target standard cell from IV/CV curves generated from the 3D structure by using the extraction tool. In an example embodiment, the PEX model may include at least one of a 2D PEX model extracted by using a tool such as StarRC™ and a 3D PEX model extracted by using a tool Raphael™.

The assessment engine 140 may perform an assessment operation based on a standard cell model. The assessment operation may include various assessment operations such as ground rule assessment, area scaling assessment, performance-power assessment, and yield assessment.

The GR assessment operation indicates an operation of assessing whether the standard cell model STC-MD satisfies a ground rule. For example, to prevent a defect due to physical characteristics of various elements of a target standard cell, the various elements of the target standard cell may maintain a particular interval (or distance). In detail, a gate contact and a source contact included in a target standard cell may be spaced from each other by a given distance for the purpose of preventing interference due to an electrical characteristic of the respective gate and source contacts. The ground rule assessment operation indicates an operation of assessing whether a physical distance between elements satisfies a preset condition (i.e., a ground rule). In an example embodiment, the ground rule may be determined according to a process condition associated with a target standard cell. In an example embodiment, a design rule of a target standard cell may be updated according to a result of the ground rule assessment operation.

The area scaling assessment operation may test whether the design rule updated according to the result of the ground rule assessment operation is appropriate. For example, whether a process scale determined by the control engine 110 among the vertical parameters is appropriate for the updated design rule may be tested. In an example embodiment, in the area scaling assessment operation, large-scaled standard cells such as a flip-flop, an AOI, and the like may be tested in consideration of an influence of complexity of a metal wire on an area scale.

The performance-power assessment operation indicates an operation of assessing performance and power consumption of the target standard cell. In the performance-power assessment operation, parameters such as a size of a target standard cell, a fan-out type, Vdd/Vth swap, a user scenario for a dynamic power, BEOL RC loading, and the like may be adjusted for exact comparison. In an example embodiment, the performance-power assessment operation may be performed on a basic standard cell such as an inverter, a 2-input NAND gate, a 2-input NOR gate, and the like.

The yield assessment operation may indicate an operation of assessing whether an electrical margin of a target standard cell is appropriate. For example, the yield assessment operation may be performed on a six transistor (6-TR) SRAM cell in which a statistical change is present in a pull-up transistor, a pull-down transistor, and a pass gate transistor. Vmin may be determined based on a read/write/interference margin at each Vdd.

In an example embodiment, the assessment engine 140 may be configured to perform various assessment operations by driving a Simulation Program with Integrated Circuit Emphasis (SPICE) simulation based on the standard cell model STC-MD and to output an assessment result ASR.

The auto-optimizing engine 150 may perform an auto layout generation operation and a multi-objective optimization operation, based on the assessment result ASR from the assessment engine 140. For example, the assessment result ASR from the assessment engine 140 may include various information (e.g., PPAY) about a target standard cell. In an example embodiment, the assessment result ASR may be changed according to the plurality of parameters Xs (including the planar parameter and the vertical parameter) of the target standard cell. For example, the performance, power, area, and yield of the target standard cell may vary with the size of an active area of a target standard cell or process scaling of the target standard cell. The auto-optimizing engine 150 may adjust the planar parameter and the vertical parameter of the target standard cell such that the performance, power, area, and yield of the target standard cell may be optimized.

In an example embodiment, the auto-optimizing engine 150 may perform the optimization operation, based on machine learning or a machine learning algorithm. For example, the auto-optimizing engine 150 may be configured to generate a training model by performing a training operation on a randomly sampled target standard cell and to perform the above-described auto optimization operation based on the generated training model. The auto-optimizing engine 150 may determine (i.e., optimize) the plurality of parameters Xs (including the planar parameter and the vertical parameter) such that the performance is improved, power consumption is reduced, the area decreases, and the yield increases.

The control engine 110 may again determine the plurality of parameters Xs based on a result Xs' of the auto optimization operation of the auto-optimizing engine 150 and the above-described operations are repeatedly performed, and thereby the planar parameters and the vertical parameters optimized with regard to the target standard cell may be determined. The optimized planar parameters and the optimized vertical parameters may be output as the optimized standard cell information OSI.

In an example embodiment, a standard cell which is generated based on the optimized planar parameters and the optimized vertical parameters may satisfy a preset reference value in various conditions such as the PPAY. In an example embodiment, the preset reference value may vary with a type of a target standard cell, a process scheme applied to the target standard cell, a process scaling, and the like.

According to the above example embodiment, the standard cell design system 100 may output the optimized standard cell information OSI of target standard cell. In this case, the standard cell design system 100 may reduce a time taken to optimize a standard cell by performing an optimization operation based on machine learning.

Figure 3:
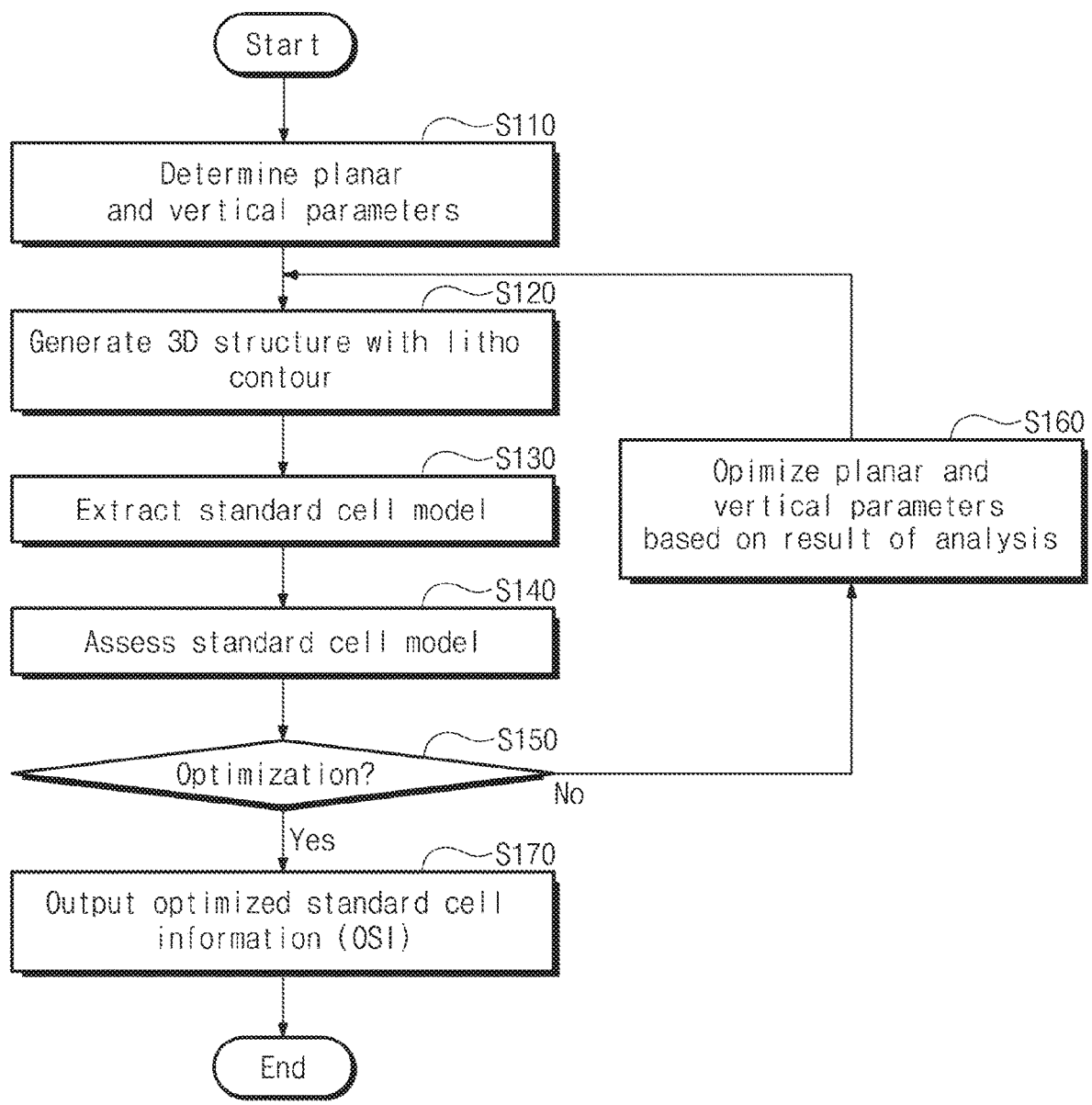
FIG. 3 is a flowchart illustrating an operation in which a standard cell design system of FIG. 2 performs auto optimization on a target standard cell according to an example embodiment.

FIG. 3 is a flowchart illustrating an operation in which a standard cell design system performs auto optimization on a target standard cell. Referring to FIGS. 2 and 3, in operation S110, the standard cell design system 100 may determine planar parameters and vertical parameters. As described above, the planar parameters may include information about a planar layout for a target standard cell, and the vertical parameters may include information about a process condition for the target standard cell.

In operation S120, the standard cell design system 100 may generate the 3D structure 3D-STR to which the litho contour is applied, based on the planar parameters and the vertical parameters. For example, the standard cell design system 100 may generate the 3D structure 3D-STR for the target standard cell, based on numerical planar parameters and numerical vertical parameters.

In operation S130, the standard cell design system 100 may extract a standard cell model from the generated 3D structure 3D-STR. For example, the standard cell design system 100 may extract various parameters from the 3D structure 3D-STR and may generate the standard cell model STC-MD for the target standard cell based on the extracted parameters.

In operation S140, the standard cell design system 100 may perform various assessment operations on the target standard cell based on the standard cell model STC-MD. For example, the standard cell design system 100 may assess various items, such as PPAY, on the target standard cell by driving the SPICE simulation based on the standard cell model STC-MD.

In an example embodiment, items targeted for assessment may vary with a kind of a target standard cell. For example, performance-power may be assessed on basic standard cells such as an inverter, a 2-input NAND gate, a 2-input NOR gate, and the like. The area scaling may be assessed on standard cells such as a flip-flop, an AOI, and the like. The yield may be assessed on a standard cell such as an SRAM and the like. However, example embodiments are not limited thereto.

In operation S150, the standard cell design system 100 may determine whether the assessment result is optimized. For example, the standard cell design system 100 may determine whether the assessment result satisfies a preset reference value. The preset reference value may include a performance condition, a power condition, an area condition, or a yield condition associated with the target standard cell. The preset reference value may vary with a type of a target standard cell, a process scheme associated with the target standard cell, a process scaling, etc.

In the case where it is determined in operation S150 that the assessment result is not optimized (or does not satisfies the preset reference value), in operation S160, the standard cell design system 100 may optimize a planar parameter and a vertical parameter. For example, the standard cell design system 100 may again set a planar parameter and a vertical parameter such that the assessment result is optimized. For example, the standard cell design system 100 may adjust planar parameters and vertical parameters such that the performance is improved, the power consumption is reduced, the area decreases, and the yield increases. After the planar parameter and the vertical parameter are adjusted, the standard cell design system 100 may again perform operation S120.

In the case where it is determined in operation S150 that the assessment result is optimized, in operation S170, the standard cell design system 100 may output the planar parameter and the vertical parameter as the optimized standard cell information OSI.

As described above, the standard cell design system 100 may output optimized standard cell information with regard to the target standard cell by repeatedly performing the auto optimization operation described with reference to FIG. 3. In an example embodiment, operation S150 and operation S160 may be performed based on the machine learning.

Figure 4A:
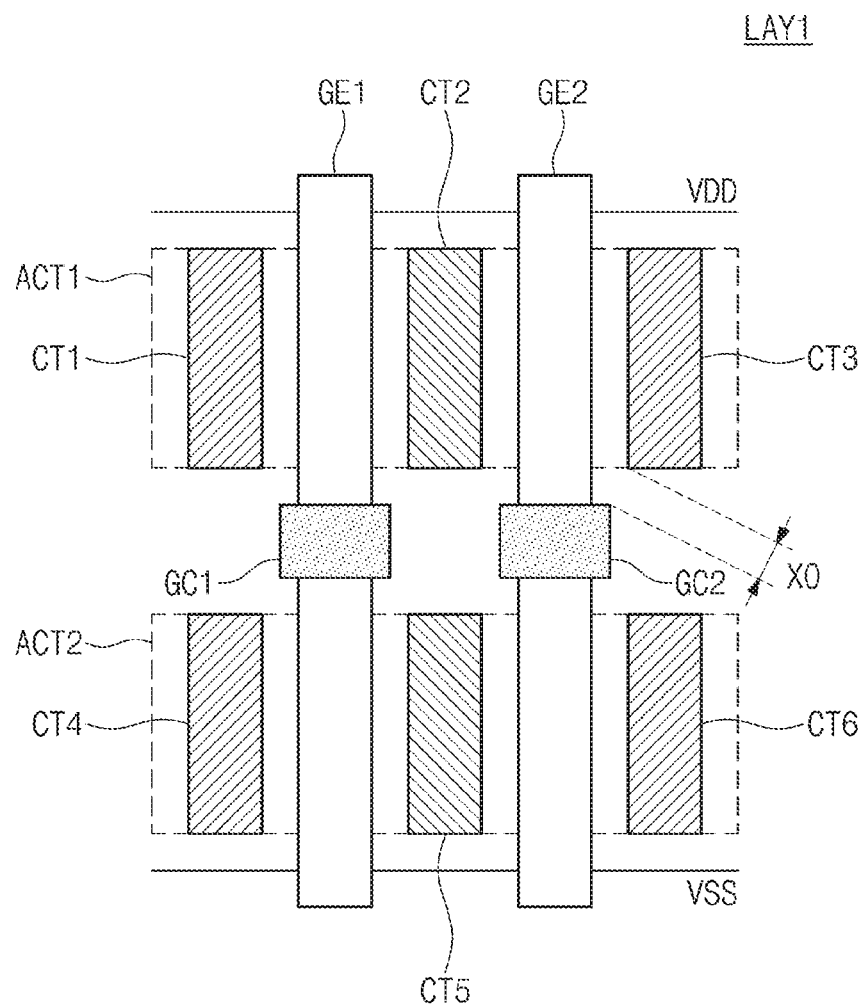
FIGS. 4A and 4B are views illustrating a planar layout of a target standard cell according to example embodiments.
Figure 4B:
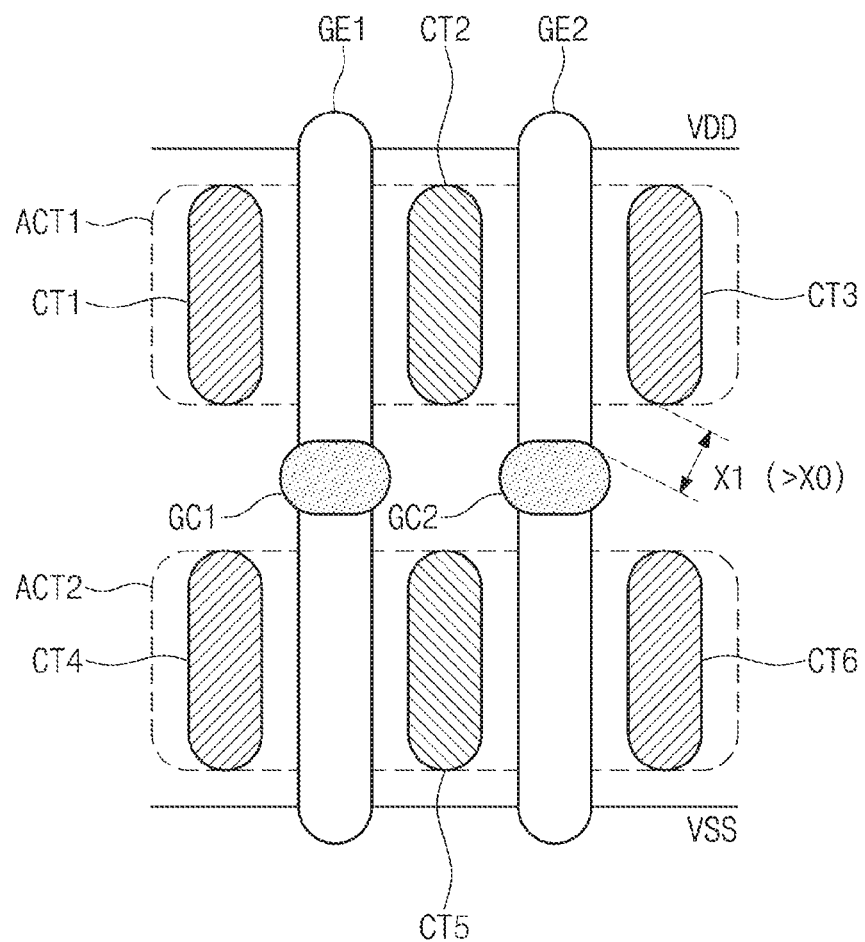

FIGS. 4A and 4B are views illustrating a planar layout of a target standard cell according to example embodiments. The litho contour based on the OPC model will be described with reference to layouts LAY1 and LAY2 of FIGS. 4A and 4B.

Referring to FIGS. 2, 4A and 4B, the control engine 110 may determine a layout for a target standard cell by using a planar parameter of the target standard cell. In this case, the target standard cell may include first and second active areas ACT1 and ACT2, first to sixth contacts CT1 to CT6, first and second gate electrodes GE1 and GE2, and first and second gate contacts GC1 and GC2. A general planar layout of the target standard cell may be formed like the first layout LAY1 of FIG. 4A. Like the first layout LAY1 of FIG. 4A, the general planar layout may have an ideal shape (i.e., a shape in which an edge area is rectangular).

In contrast, according to an example embodiment, the 3D structure generating engine 120 may apply the litho contour, which is based on the OPC model, to the first layout LAY1. In this case, a layout of the target standard cell to which the litho contour is applied may correspond to the second layout LAY2 of FIG. 4B. For example, in the case of generating a target standard cell based on the first layout LAY1, due to various physical factors of a semiconductor manufacturing process, the target standard cell may not be formed in the same shape as the first layout LAY1.

That is, the 3D structure generating engine 120 may generate a 3D structure, the shape of which is similar to that of a target standard cell actually formed, by applying the OPC model-based litho contour to the 3D structure. In an example embodiment, the litho contour is based on the OPC model which is determined according to various process conditions (e.g., a process scheme, a composition material of a target standard cell, and process scaling) of the target standard cell.

In this case, the accuracy of assessment associated with the 3D structure may be improved. For example, in the first layout LAY1 to which the litho contour is not applied, a distance between a gate contact and a source contact is "X0". In contrast, in the second layout LAY2 to which the litho contour is applied, a distance between a gate contact and a source contact is "X1".

To prevent a defect, a gate contact and a source contact may be spaced from each other by a minimum distance depending on an electrical characteristic of a target standard cell. Here, even though a length of "X0" is shorter than the above-described minimum distance, the length of "X1" is longer than the minimum distance. Thus, a minimum distance condition for a target standard cell to be manufactured is satisfied in the second layout LAY2 (in other words, a defect due to the minimum distance condition does not exist).

That is, it is possible to increase a distance between a gate electrode and an adjacent contact, by applying the OPC model-based litho contour. That is, the 3D structure generating engine 120 according to example embodiments may reflect an actually manufactured shape of a target standard cell by applying the OPC model-based litho contour to a 3D structure. Thus, the accuracy of the ground rule assessment operation or the area scaling assessment operation may be improved.

Figure 5:
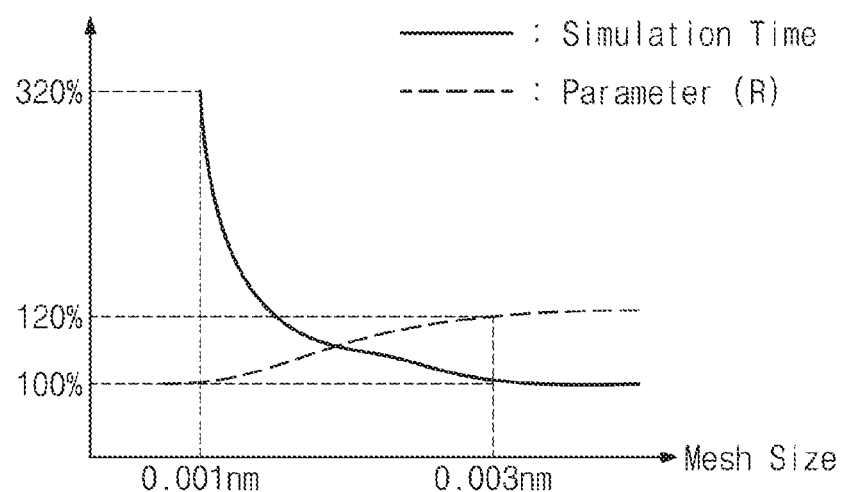
FIG. 5 is a graph for describing a mesh size of a standard cell model.

FIG. 5 is a graph for describing a mesh size of a standard cell model. Referring to FIG. 5, in the extreme process scale, accuracy and a simulation time of a parameter (e.g., a resistance value) extracted from a standard cell model may vary with a mesh size of the standard cell model. In general, in the case where the mesh size increases, the simulation time may decreases, but a magnitude of the extracted parameter (e.g., a resistance value) and an actual value may differ from each other. In contrast, in the case where the mesh size decreases, the magnitude of the extracted parameter may be similar to the actual value, but the simulation time may increase.

For example, as illustrated in FIG. 5, in the case where the mesh size is 0.003 nm, a value of an extracted parameter may have a magnitude of approximately 120% compared with an actual value, and a simulation time may have a time similar to a reference value (or a certain time). In contrast, in the case where the mesh size is 0.001 nm, the value of the extracted parameter may be similar to the actual value, but the simulation time may increase approximately 300% or more compared with the reference value (or the certain time).

An extraction engine according to an example embodiment may determine an optimized mesh size in consideration of a simulation time and an accuracy of an extracted parameter, and may extract a standard cell model based on the optimized mesh size.

Figure 6:
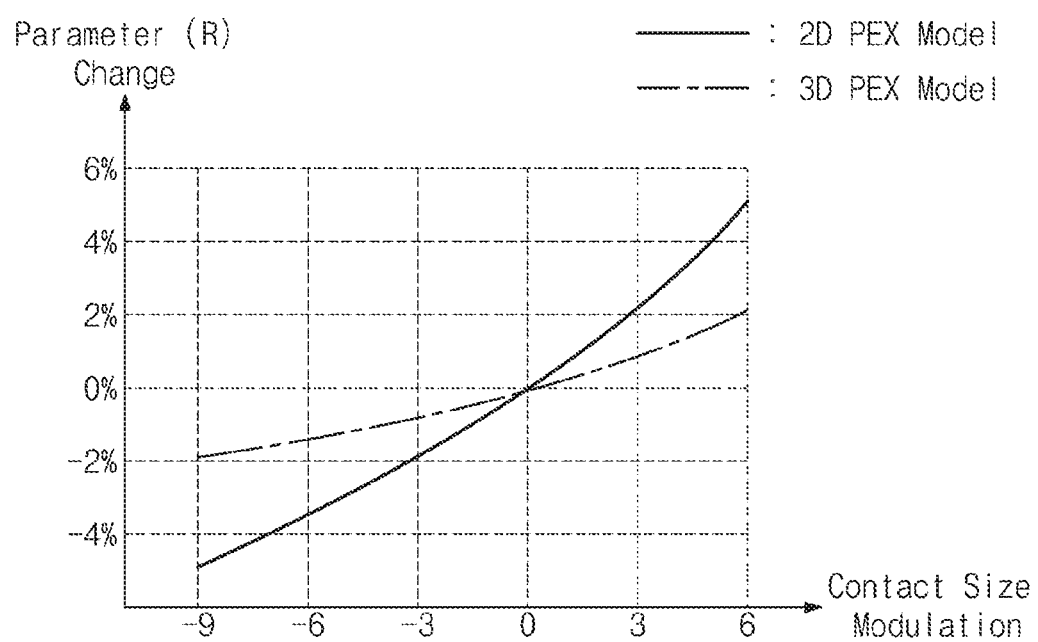
FIG. 6 is a diagram for describing an accuracy of assessment of a standard cell model according to an example embodiment.

FIG. 6 is a diagram for describing an accuracy of assessment of a standard cell model according to an example embodiment. Referring to FIG. 6, the extraction engine 130 according to an example embodiment is configured to extract a standard cell model from a 3D structure. The standard cell model may be extracted as a 2D PEX model by using a 2D extraction tool such as StarRC™, or may be extracted as a 3D PEX model by using an extraction tool such as Raphael™.

In an example embodiment, an accuracy of an extracted parameter (e.g., a resistance value) in the case where the standard cell model is extracted as the 3D PEX model by using the 3D extraction tool may be improved compared with the case where the standard cell model is extracted as the 2D PEX model by using the 2D extraction tool. For example, as illustrated in FIG. 6, when the size of a contact (e.g., a length of the second contact CT2 of FIG. 4B) varies, variations in the extracted parameter (e.g., a resistance value R) in the case where the 3D extraction tool is used may be greater than those in the case where the 2D extraction tool is used. This is because an increased portion of barrier metal layers in the contact (e.g., the second contact CT2 of FIG. 4B) is considered upon extracting a parameter by the 3D extraction tool. That is, the accuracy of the extracted parameter may be improved by using the 3D extraction tool, and thus, an optimization accuracy of the target standard cell may be improved.

In an example embodiment, a difference between the 2D PEX model and the 3D PEX model described with reference to FIG. 6 is only for describing the accuracy of parameter variations, and example embodiments are not limited thereto. For example, in the case where the process scaling for the target standard cell is relatively great, a difference between parameter variations of the 2D PEX model and the 3D PEX model may be relatively small. That is, even though the 2D PEX model is used, the standard cell design system 100 according to example embodiments may normally perform the optimization operation on the target standard cell.

Figure 7:
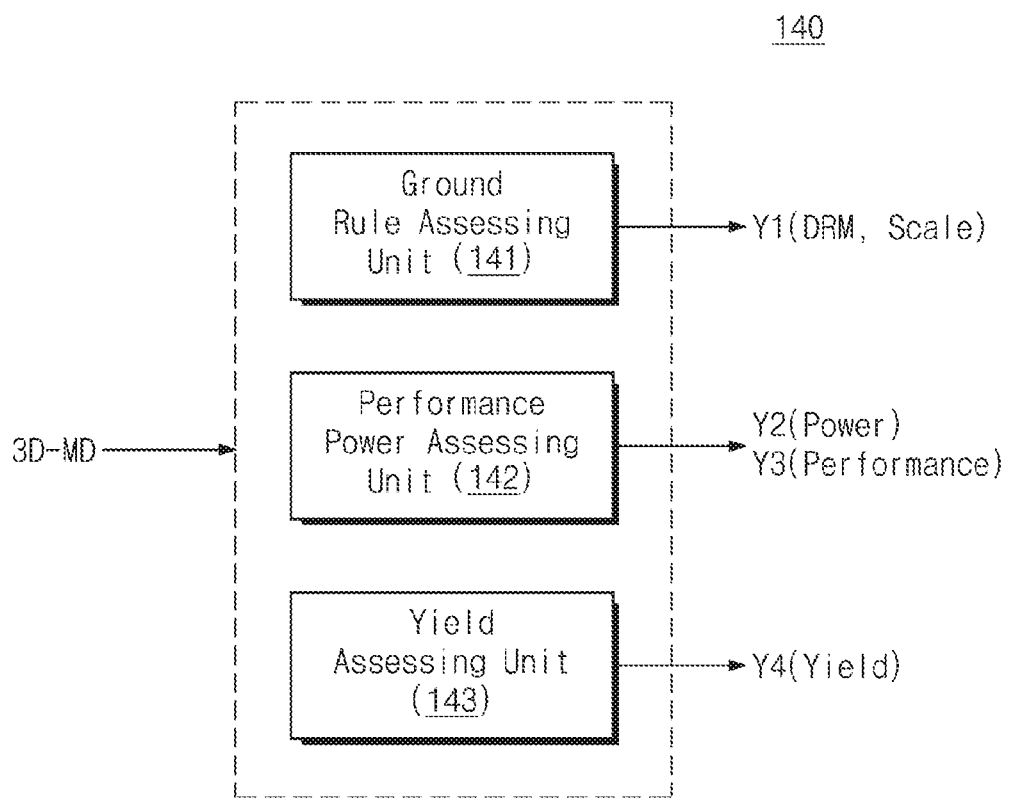
FIG. 7 is a block diagram illustrating an assessment engine according to an example embodiment.

FIG. 7 is a block diagram illustrating an assessment engine according to an example embodiment. Referring to FIGS. 2 and 7, the assessment engine 140 may perform various assessment operations based on a standard cell model. For example, the assessment engine 140 may include a ground rule assessing unit 141, a performance-power assessing unit 142, and a yield assessing unit 143.

The ground rule assessing unit 141 may perform a ground rule assessment operation and an area scaling assessment operation on a target standard cell based on a standard cell model. As described with reference to FIG. 2, the ground rule assessment operation may indicate an operation of assessing whether the target standard cell satisfies a preset layout condition (i.e., a ground rule), based on a standard cell model STC-MD. The area scaling assessment operation may test whether a design rule updated according to a result of the ground rule assessment operation is appropriate. The ground rule assessment operation and the area scaling assessment operation are described above, and thus, additional description will be omitted to avoid redundancy.

The performance-power assessing unit 142 may perform a performance-power assessment operation on the target standard cell based on the standard cell model. The performance-power assessment operation indicates an operation of assessing performance and power consumption of the target standard cell, based on the standard cell model STC-MD. The performance-power assessment operation is described above, and thus, additional description will be omitted to avoid redundancy.

The yield assessing unit 143 may perform a yield assessment operation on the target standard cell based on the standard cell model STC-MD. The yield assessment operation indicates an operation of assessing a yield on the target standard cell, based on the standard cell model STC-MD. The yield assessment operation is described above, and thus, additional description will be omitted to avoid redundancy.

In an example embodiment, each of the ground rule assessing unit 141, the performance-power assessing unit 142, and the yield assessing unit 143 may perform the corresponding assessment operation individually, based on the standard cell model STC-MD. Alternatively, the ground rule assessing unit 141, the performance-power assessing unit 142, and the yield assessing unit 143 may sequentially perform the corresponding assessment operations, based on the standard cell model STC-MD.

In an example embodiment, each of the ground rule assessing unit 141, the performance-power assessing unit 142, and the yield assessing unit 143 may perform the corresponding assessment operation, and may output a result of the corresponding assessment operation.

For example, the ground rule assessing unit 141 may perform the ground rule assessment operation on the target standard cell and may output information about a design rule DRM or a scale as a first assessment result Y1. The performance-power assessing unit 142 may perform the performance-power assessment operation on the target standard cell and may output information about performance and power as a second assessment result Y2. The yield assessing unit 143 may perform the yield assessment operation on the target standard cell and may output information about a yield as a third assessment result Y3. The above-described assessment results Y1 to Y4 are examples, and example embodiments are not limited thereto.

In an example embodiment, some of a plurality of assessment operations may be performed according to a type of a target standard cell. Performance-power may be assessed on basic standard cells such as an inverter, a 2-input NAND gate, and a 2-input NOR gate, the area scaling may be assessed on standard cells such as a flip-flop and an AOI, and the yield may be assessed on a standard cell such as an SRAM. However, example embodiments are not limited thereto.

Figure 8:
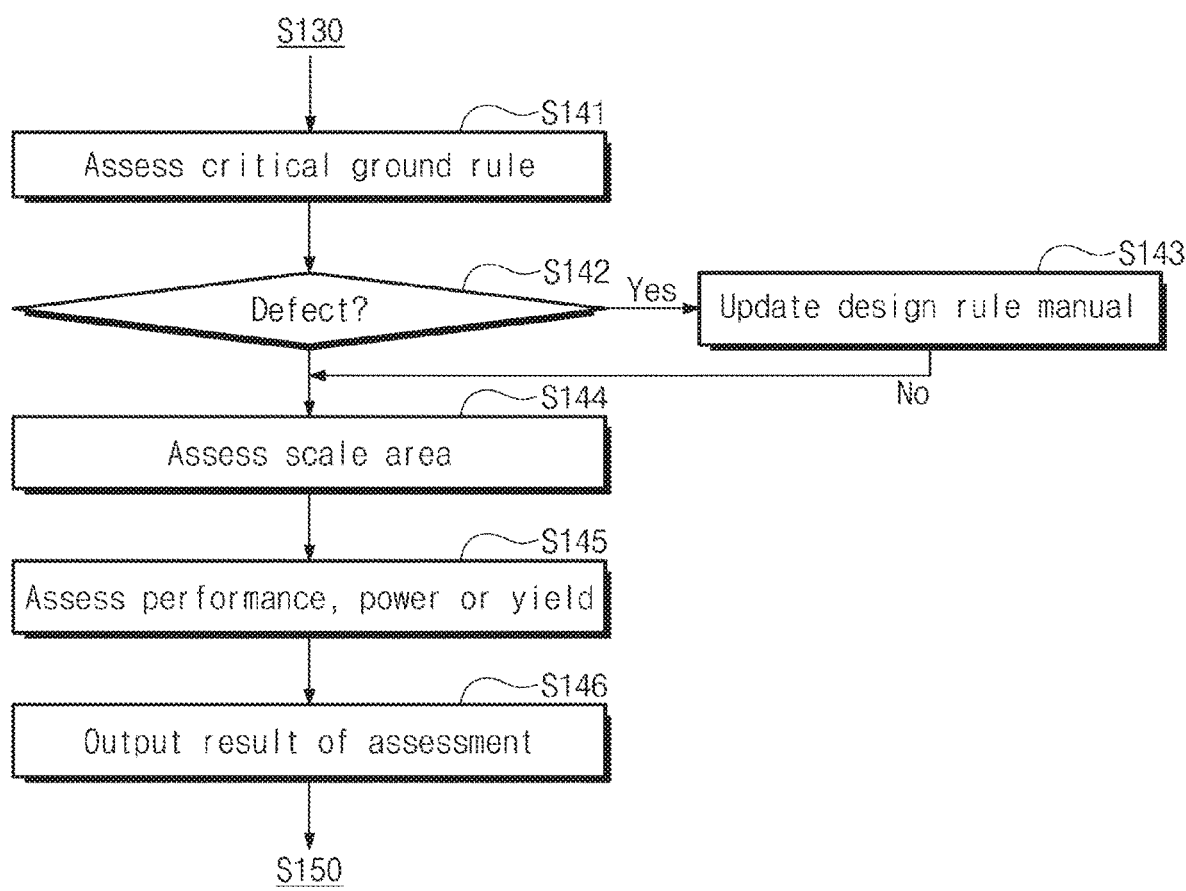
FIG. 8 is a flowchart illustrating an operation of an assessment engine of FIG. 7 according to an example embodiment.

FIG. 8 is a flowchart illustrating an operation of an assessment engine of FIG. 7. Referring to FIGS. 7 and 8, the assessment engine 140 may perform various assessment operations by performing operation S141 to operation S146.

In operation S141, the assessment engine 140 may assess a critical ground rule on a target standard cell. For example, the ground rule assessing unit 141 of the assessment engine 140 may assess whether the target standard cell satisfies a ground rule, based on a standard cell model.

In operation S142, the assessment engine 140 may determine whether a defect exists. For example, the assessment engine 140 may determine whether a defect (e.g., chronic systematic defects) associated with the ground rule exists.

In the case where it is determined in operation S142 that the defect exists, in operation S143, the assessment engine 140 may update a design rule manual DRM. For example, the assessment engine 140 may screen out the defect associated with the ground rule. The design rule manual DRM may be updated according to information about the defect thus screened out.

In operation S144, the assessment engine 140 may perform area scaling assessment. In this case, the target standard cell may be again drawn by using the design rule manual or the updated design rule manual, and the area scaling may be assessed at a new node. In an example embodiment, a design rule may be tested in the area scaling assessment.

In operation S145, the assessment engine 140 may assess performance, power, or yield. The performance, power, or yield assessment operation is described above, and thus, additional description will be omitted to avoid redundancy.

In operation S146, the assessment engine 140 may output the assessment result. In an example embodiment, the assessment result may be provided to the auto-optimizing engine 150.

In an example embodiment, the above-described assessment operations of the assessment engine 140 may be automatized. For example, the assessment engine 140 may be configured to automatically perform the various assessment operations by driving the SPICE simulation based on an extracted standard cell model and to automatically output assessment results. The assessment results may include information about whether the corresponding items (e.g., performance, power, area, and yield) satisfy reference values, respectively or numerical information about each of the corresponding items.

Figure 9:
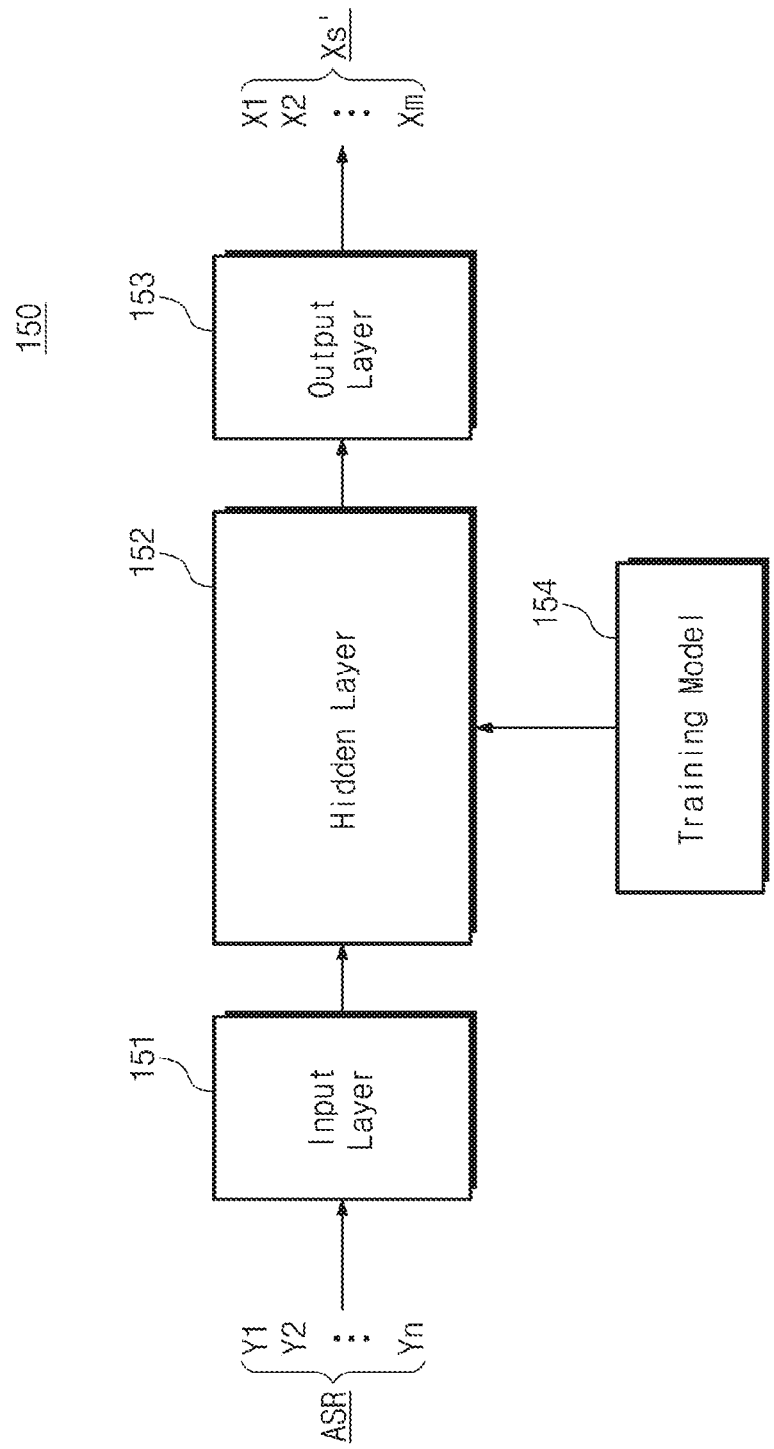
FIG. 9 is a diagram illustrating an auto-optimizing engine of FIG. 2 according to an example embodiment.

FIG. 9 is a diagram illustrating an auto-optimizing engine 150. Referring to FIG. 9, the auto-optimizing engine 150 may include an input layer 151, a hidden layer 152, an output layer 153, and a training model 154. The auto-optimizing engine 150 may perform the optimization operation based on a machine learning algorithm or a neural network algorithm.

The input layer 151 may receive assessment results ASR, Y1 to Yn, of assessment operations (e.g., assessment results of PPAY associated with a target standard cell) and may transfer the results Y1 to Yn to the hidden layer 152. The output layer 153 may output planar and vertical parameters X1 to Xm optimized from the hidden layer 152.

The hidden layer 152 may convert values received through the input layer 151 to values required for the optimization operation. All nodes included in the input layer 151 and the hidden layer 152 may be connected to each other through weights, and all nodes included in the hidden layer 152 and the output layer 153 may be connected to each other through weights. In this case, the weights may be set to values which are based on the training model 154 generated through a training operation.

The training model 154 may be generated based on the training operation of the auto-optimizing engine 150. The training model 154 may be a model which is generated by training information about a relationship between the planar and vertical parameters X1 to Xm of the target standard cell and the assessment results Y1 to Yn. The training model 154 may be modeled such that the planar and vertical parameters X1 to Xm are determined in the direction of optimizing the assessment results Y1 to Yn.

The auto-optimizing engine 150 may generate the training model 154 by performing various assessment operations (e.g., PPAY) on the randomly sampled planar and vertical parameters X1 to Xm, and performing a training operation based on the result Y1 and Yn of the assessment operations and the randomly sampled planar and vertical parameters X1 to Xm. In an example embodiment, the training model 154 may be updated as the auto-optimizing engine 150 repeatedly performs the optimization operation.

As described above, the auto-optimizing engine 150 may determine the planar and vertical parameters X1 to Xm by using the machine learning algorithm or the neural network algorithm such that the assessment result Y1 and Yn associated with the target standard cell are optimized. Thus, a time required to determine the optimized standard cell information OSI may be shortened by the auto-optimizing engine 150.

The auto-optimizing engine 150 which operates based on the neural network is described with reference to FIG. 9, but example embodiments are not limited thereto. For example, the auto-optimizing engine 150 may perform the above-described optimization operation based on any one of various machine learning algorithms such as a supervised learning algorithm, a semi-supervised learning algorithm, an unsupervised learning algorithm, or a reinforcement learning algorithm.

Figure 10A:
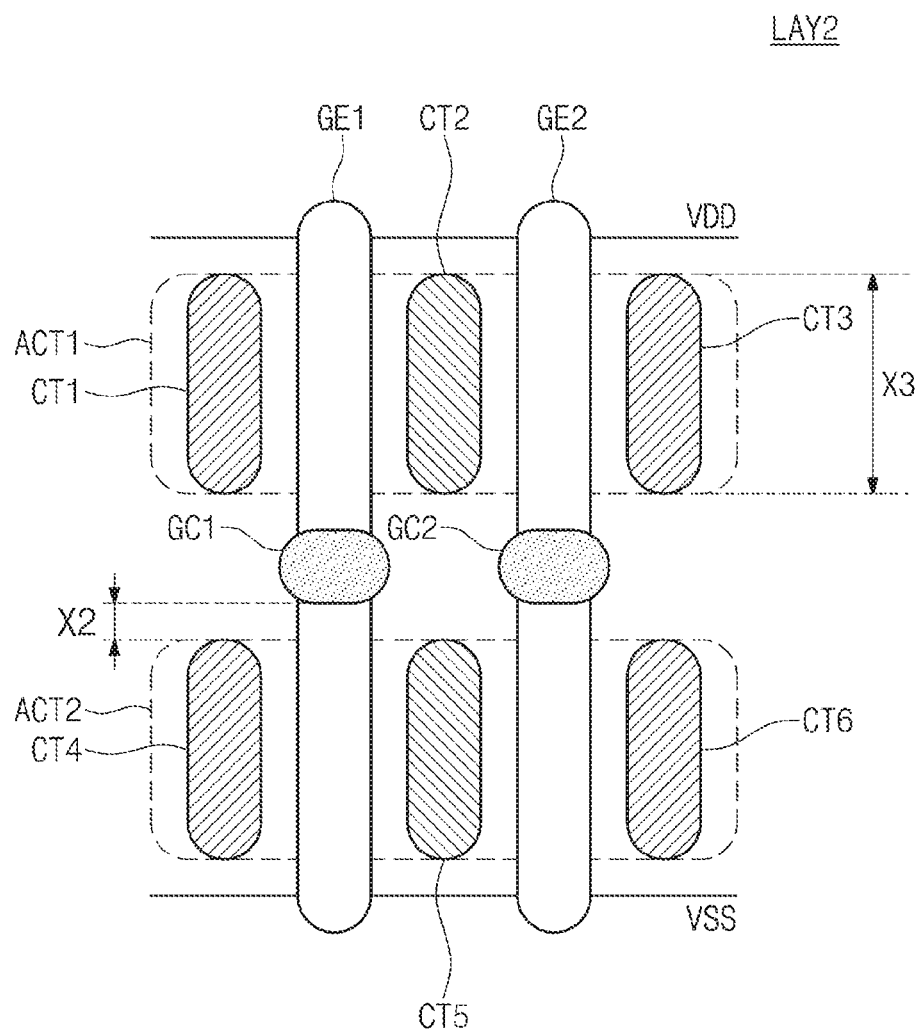
FIGS. 10A and 10B are views for describing an operation of an auto-optimizing engine according to an example embodiment.
Figure 10B:
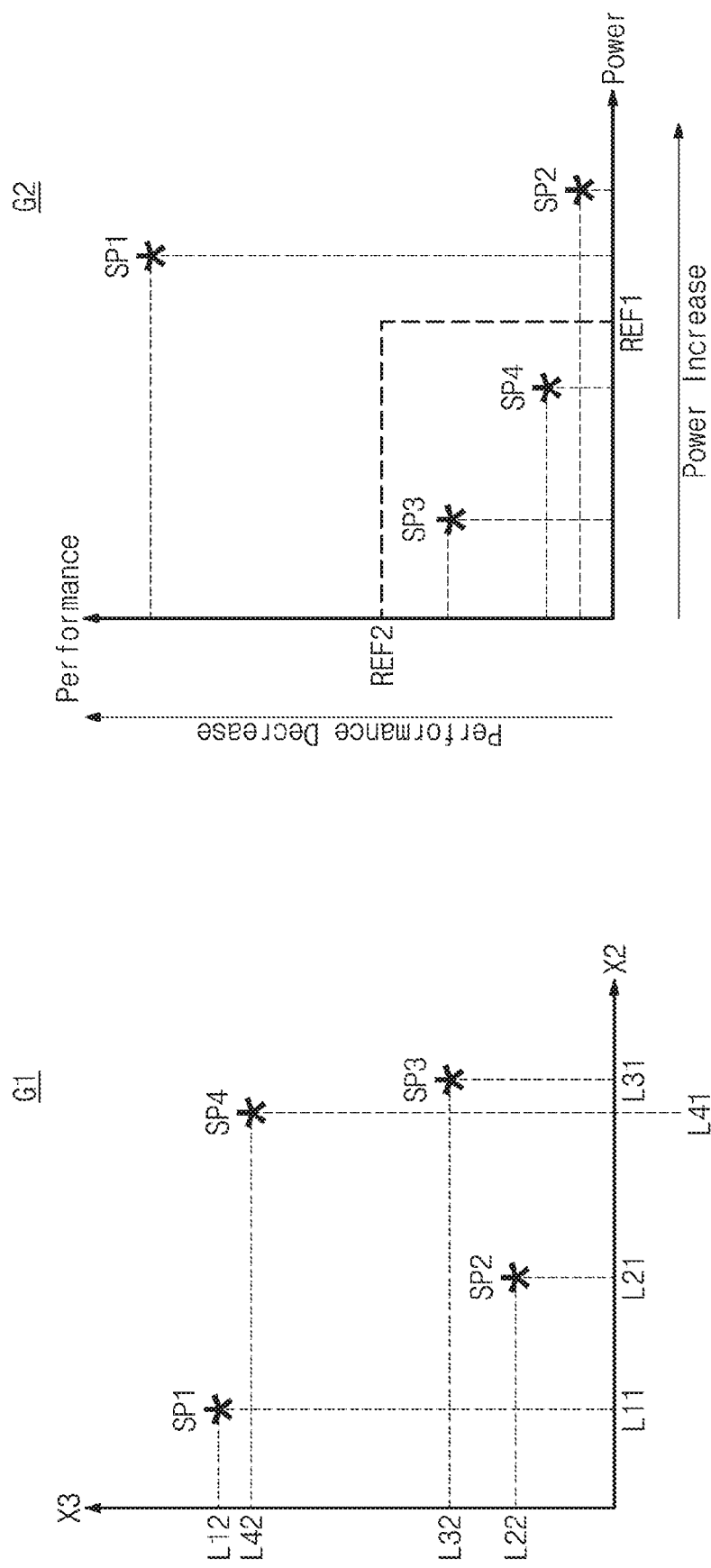

FIGS. 10A and 10B are views for describing an operation of an auto-optimizing engine. For convenience of description, an optimization operation associated with performance-power of some planar parameters X1 and X2 will be described with reference to FIGS. 10A and 10B. However, example embodiments are not limited thereto. For example, various planar parameters and various vertical parameters may be adjusted to optimize various conditions (e.g., PPAY).

A target standard cell may have the same structure as the second layout LAY2 of FIG. 10A. For example, the target standard cell may include the first and second active areas ACT1 and ACT2, the first to sixth contacts CT1 to CT6, the first and second gate electrodes GE1 and GE2, and the first and second gate contacts GC1 and GC2. The second layout LAY2 of FIG. 10A is similar to the second layout LAY2 of FIG. 4B, and thus, additional description will be omitted to avoid redundancy.

In this case, it is assumed that a distance between a gate electrode and an active area is "X2" and a length of the active area is "X3". In this case, an assessment result (e.g., an assessment result associated with performance-power) may vary with the lengths of "X2" and "X3". For example, a first graph G1 of FIG. 10B shows sampling points associated with the lengths of "X2" and "X3". A second graph G2 of FIG. 10B shows performance-power assessment results respectively corresponding to the sampling points of the first graph G1.

For example, a first sampling point SP1 indicates the case where the length of "X2" is "L11" and the length of "X3" is "L12". Performance-power assessment result associated with a standard cell model of the target standard cell generated based on the first sampling point SP1 may indicate that a power (i.e., power consumption) is greater than a reference value REF1 and performance is lower than a reference value REF2. That is, "X2" and "X3" values of the first sampling point SP1 may be parameters which fail to satisfy the reference values REF1 and REF2 of the performance-power. In other words, the "X2" and "X3" values of the first sampling point SP1 may not be optimized parameters.

A second sampling point SP2 indicates the case where the length of "X2" is "L21" and the length of "X3" is "L22". Performance-power assessment result associated with a standard cell model of the target standard cell generated based on the second sampling point SP2 may indicate that a power is greater than the reference value REF1 and performance is higher than the reference value REF2. That is, with regard to the second sampling point SP2, a performance condition may be satisfied, but a power condition may not be satisfied. Accordingly, the "X2" and "X3" values of the second sampling point SP2 may not be optimized parameters.

As in the above description, a third sampling point SP3 indicates the case where the length of "X2" is "L31" and the length of "X3" is "L32", and a fourth sampling point SP4 indicates the case where the length of "X2" is "L41" and the length of "X3" is "L42". Performance-power assessment results associated with standard cell models of the target standard cell generated based on the third and fourth sampling points SP3 and SP4 may indicate that a power is smaller than the reference value REF1 and performance is higher than the reference value REF2. That is, the "X2" and "X3" values of the third and fourth sampling points SP3 and SP4 may be values which satisfy both a performance condition and a power condition. The auto-optimizing engine 150 may adjust the "X2" and "X3" values of the target standard cell such that the performance-power conditions may be satisfied.

In an example embodiment, the standard cell design system 100 may perform random sampling on the above-described planar or vertical parameter and may repeatedly perform various assessment operations on respective sampling points randomly sampled. The standard cell design system 100 may determine a Pareto set for a planar parameter or a vertical parameter in which the performance, power, area, or yield is optimized, by repeatedly performing the above-described operation based on the machine learning algorithm or the neural network algorithm. The Pareto set may indicate information about planar parameters and vertical parameters in which assessment results are optimized. The standard cell design system 100 may determine optimized standard cell information about a target standard cell through the above-described operation which is based on the machine learning algorithm or the neural network algorithm.

An example is described with reference to FIGS. 10A and 10B as the performance-power assessment result varies as two planar parameters X2 and X3 change, but example embodiments are not limited thereto. For example, as well as the performance-power assessment result, an area or yield assessment result may vary as the planar parameters X2 and X3 described with reference to FIGS. 10A and 10B change. Also, in addition to the planar parameters X2 and X3 described with reference to FIGS. 10A and 10B, the performance-power assessment result may vary as any other planar parameter or any other vertical parameter changes.

That is, various assessment results may be changed individually or complexly as each of various planar parameters and various vertical parameters associated with a target standard cell changes or a combination thereof changes. In a related optimization scheme, due to the complex relationship, an excess amount of time is required to obtain the optimized standard cell information OSI of the target standard cell. However, the auto-optimizing engine 150 according to example embodiments may perform the optimization operation based on the machine learning algorithm or the neural network algorithm. Accordingly, there may decrease a time taken to obtain optimized standard cell information associated with a target standard cell.

Figure 11:
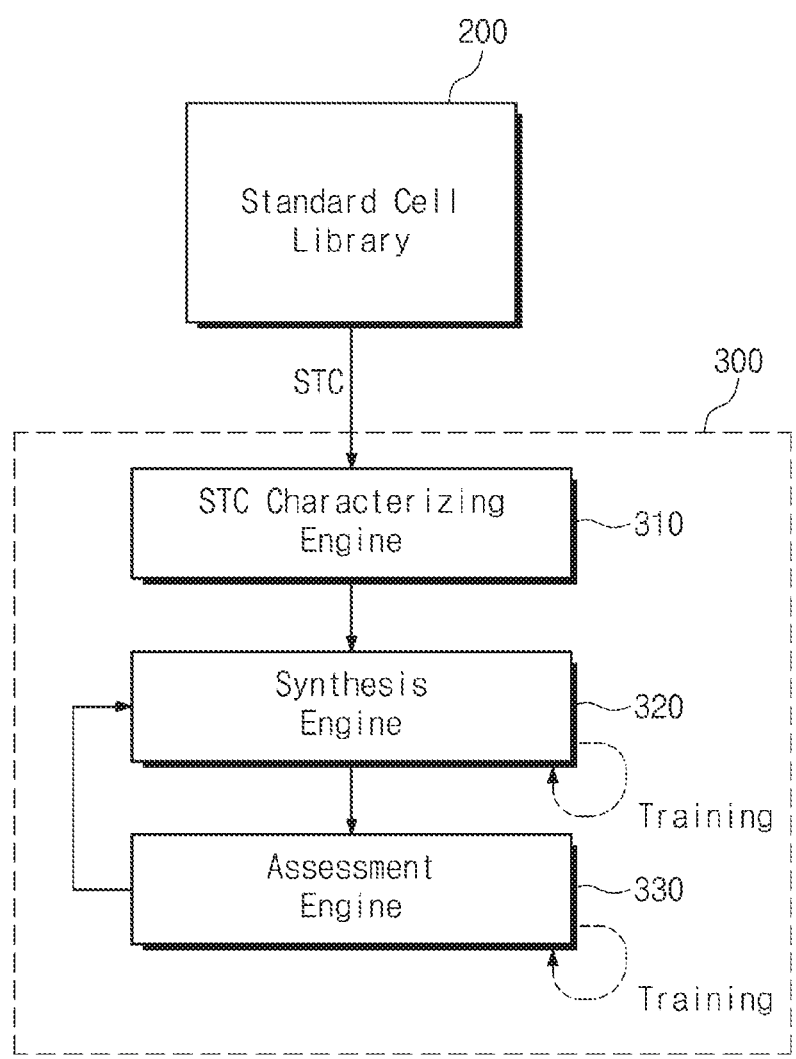
FIG. 11 is a diagram for describing a block-level design system of FIG. 1 according to an example embodiment.

FIG. 11 is a diagram for describing a block-level design system of FIG. 1 according to an example embodiment. Referring to FIGS. 1 and 11, the block-level design system 300 may be configured to generate the block layout BLK LAY based on various standard cell information stored in the standard cell library 200. The block layout BLK LAY may indicate a layout for manufacturing a target semiconductor device, which performs an intended function, by using various standard cell information stored in the standard cell library 200. For example, the block layout BLK LAY may include various information required to generate a target semiconductor device, such as information about placement of a plurality of standard cells and information about wires connecting the plurality of standard cells.

The block-level design system 300 may include a standard cell characterizing engine 310, a synthesis engine 320, and an assessment engine 330. The standard cell characterizing engine 310 may convert or characterize standard cell information STC from the standard cell library 200 to information necessary to generate or assess the block layout BLK LAY. For example, the standard cell characterizing engine 310 may characterize information such as a delay, an operation timing, a power, and a signal reliability of a corresponding standard cell, based on the standard cell information STC.

The synthesis engine 320 may generate the block layout BLK LAY by combining a plurality of standard cells, based on the information characterized by the standard cell characterizing engine 310. For example, the synthesis engine 320 may generate the block layout BLK LAY including information such as placement of a plurality of standard cells on a semiconductor wafer and placement of wires for interconnecting the plurality of standard cells.

The assessment engine 330 may perform various assessment operations on the generated block layout BLK LAY. For example, the assessment engine 330 may perform assessment on the PPAY of the block layout BLK LAY. Depending on an assessment result of the assessment engine 330, the synthesis engine 320 may adjust the block layout BLK LAY such that the assessment result is optimized. In an example embodiment, the synthesis engine 320 and the assessment engine 330 may perform the above-described operations based on the machine learning or neural network algorithm, respectively.

Figure 12:
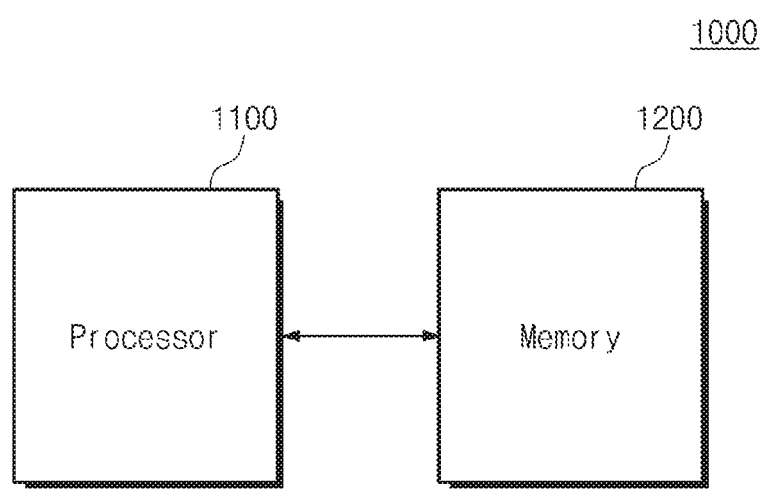
FIG. 12 is a block diagram illustrating a computing device associated with a semiconductor design system according to an example embodiment.

FIG. 12 is a block diagram illustrating a computing device associated with a semiconductor design system according to an example embodiment. Referring to FIG. 12, a computing system 1000 may include a processor 1100 and a memory 1200. The computing system 1000 may be configured to drive the semiconductor design system 10 according to an example embodiment.

For example, the memory 1200 may store instructions which are executable by the processor 1100. The processor 1100 may execute the instructions stored in the memory 1200 and may perform the operation of the semiconductor design system 10 described with reference to FIGS. 1 to 11. A result according to an operation of the processor 1100 may be stored to the memory 1200, and the result stored in the memory 1200 may be used to manufacture a semiconductor device.

As described above, according to an example embodiment, a semiconductor design system may optimize a target standard cell or a block layout by using a machine learning algorithm or a neural network algorithm. As such, compared with a related standard cell optimization operation, time necessary to search for an optimum target standard cell may be reduced.

According to an example embodiment, an optimization operation is performed on a standard cell based on a machine learning algorithm, and thus, a time to optimize a standard cell design is reduced.

While example embodiments have been described with reference to example embodiments thereof, it will be apparent to those of ordinary skill in the art that various changes and modifications may be made thereto without departing from the spirit and scope of the inventive concept as set forth in the following claims.

What is claimed is:

1. A standard cell design system comprising:
at least one processor configured to implement:
a control engine configured to determine planar parameters and vertical parameters of elements provided in a target standard cell;
a three-dimensional structure generating engine configured to generate a three-dimensional structure of the target standard cell based on the planar parameters and the vertical parameters;
an extraction engine configured to extract a standard cell model of the target standard cell from the three-dimensional structure;
an assessment engine configured to perform a plurality of assessment operations based on the standard cell model; and
an auto-optimizing engine configured to adjust, based on a machine learning algorithm, the planar parameters and the vertical parameters based on results of the plurality of assessment operations,
wherein the planar parameters include planar layout information of the target standard cell, and
wherein the vertical parameters include a plurality of process information of the target standard cell.

2. The standard cell design system of claim 1, wherein the three-dimensional structure generating engine is further configured to generate the three-dimensional structure by applying a litho contour which is based on an optical proximity correction model, and wherein the optical proximity correction model is determined based on the planar parameters and the vertical parameters.

3. The standard cell design system of claim 1, wherein the standard cell model includes a compact model and a parasitic extraction model associated with the target standard cell extracted from the three-dimensional structure.

4. The standard cell design system of claim 3, wherein the parasitic extraction model is one from among a two-dimensional parasitic extraction model and a three-dimensional parasitic extraction model.

5. The standard cell design system of claim 1, wherein the plurality of assessment operations include at least one among a ground rule assessment operation for the target standard cell, a performance-power assessment operation for the target standard cell, and a yield assessment operation for the target standard cell.

6. The standard cell design system of claim 5, wherein the assessment engine is further configured to selectively perform some of the plurality of assessment operations based on a type of the target standard cell.

7. The standard cell design system of claim 5, wherein the results of the plurality of assessment operations include information concerning at least one among an area of the target standard cell, a performance of the target standard cell, a power of the target standard cell, and a yield of the target standard cell, and
wherein the auto-optimizing engine is further configured to adjust the planar parameters and the vertical parameters based on the machine learning algorithm such to decrease the area of the target standard cell, improve the performance of the target standard cell, decrease the power of the target standard cell, and increase the yield of the target standard cell.

8. The standard cell design system of claim 1, wherein the at least one processor is further configured to generate a standard cell library based on the planar parameters and the vertical parameters adjusted by the auto-optimizing engine.

9. A standard cell design optimization method of a standard cell design system, comprising:
determining planar parameters and vertical parameters of elements provided in a target standard cell;
generating a first three-dimensional structure of the target standard cell based on the planar parameters and the vertical parameters;
extracting a first standard cell model from the first three-dimensional structure;
performing a plurality of assessment operations on the target standard cell based on the first standard cell model;
determining whether results of the plurality of assessment operations satisfy a plurality of reference values, respectively;
identifying, based on the results of the plurality of assessment operations not satisfying the plurality of reference values, readjusted planar parameters and readjusted vertical parameters based on a training model updated according to the planar parameters, the vertical parameters, and the results of the plurality of assessment operations;
generating a second three-dimensional structure based on the readjusted planar parameters and the readjusted vertical parameters;
extracting a second standard cell model based on the second three-dimensional structure; and
performing the plurality of assessment operations based on the second standard cell model,
wherein the planar parameters include planar layout information of the target standard cell, and
wherein the vertical parameters include a plurality of process information of the target standard cell.

10. The method of claim 9, wherein the first three-dimensional structure is generated by applying a litho contour which is based on an optical proximity correction model, and
wherein the optical proximity correction model is determined based on the planar parameters and the vertical parameters.

11. The method of claim 9, wherein the plurality of assessment operations include at least one among a ground rule assessment operation for the target standard cell, a performance-power assessment operation for the target standard cell, and a yield assessment operation for the target standard cell.

12. The method of claim 11, wherein the results of the plurality of assessment operations include information about at least one among an area of the target standard cell, a performance of the target standard cell, a power of the target standard cell, and a yield of the target standard cell,
wherein the plurality of reference values include at least one among a first reference value associated with the area of the target standard cell, a second reference value associated with the performance of the target standard cell, a third reference value associated with the power of the target standard cell, and a fourth reference value associated with the yield of the target standard cell, and
wherein the readjusted planar parameters and the readjusted vertical parameters are identified based on the training model such that the area of the target standard cell is smaller than the first reference value, the performance of the target standard cell is greater than the second reference value, the power of the target standard cell is less than the third reference value, and the yield of the target standard cell is greater than the fourth reference value.

13. The method of claim 11, further comprising generating the training model is generated based on a result of the plurality of assessment operations which are based on planar parameters randomly sampled with regard to the target standard cell and vertical parameters randomly sampled with regard to the target standard cell.

14. A semiconductor design system comprising:
at least one processor configured to implement:
a standard cell design system configured to optimize planar parameters and vertical parameters of elements provided in a plurality of standard cells based on a first machine learning algorithm;
a standard cell library configured to generate optimized standard cell information respectively corresponding to each of the plurality of standard cells based on the planar parameters and the vertical parameters optimized by the standard cell design system; and
a block design system configured to generate a block layout of a target semiconductor device based on the optimized standard cell information generated by the standard cell library,
wherein the planar parameters include planar layout information of the each of the plurality of standard cells, and
wherein the vertical parameters include a plurality of process information of the each of the plurality of standard cells.

15. The semiconductor design system of claim 14, wherein the at least one processor is further configured to implement, in the standard cell design system:

a control engine configured to determine planar parameters and vertical parameters of a target standard cell from among the plurality of standard cells;

a three-dimensional structure generating engine configured to generate a three-dimensional structure of the target standard cell based on the planar parameters and the vertical parameters of the target standard cell;

an extraction engine configured to extract a standard cell model of the target standard cell from the three-dimensional structure;

an assessment engine configured to perform a plurality of assessment operations based on the standard cell model; and an auto-optimizing engine configured to adjust, based on the first machine learning algorithm, the planar parameters and the vertical parameters based on results of the plurality of assessment operations.

16. The semiconductor design system of claim 14, wherein the at least one processor is further configured to implement, in the block design system:

a standard cell characterizing engine configured to generate characterized standard cell information by characterizing the optimized standard cell information from the standard cell library;

a synthesis engine configured to generate the block layout by synthesizing the characterized standard cell information; and an assessment engine configured to perform a plurality of assessment operations on the target semiconductor device based on the block layout.

17. The semiconductor design system of claim 16, wherein the synthesis engine is further configured to generate the block layout based on a second machine learning algorithm, and wherein the assessment engine is further configured to perform the plurality of assessment operations based on a third machine learning algorithm.

* * * * *